May 28, 1929.  M. H. ROBERTS  1,714,626
BOOSTER THROTTLE AND CONTROL
Filed Feb. 20, 1924   4 Sheets-Sheet 4

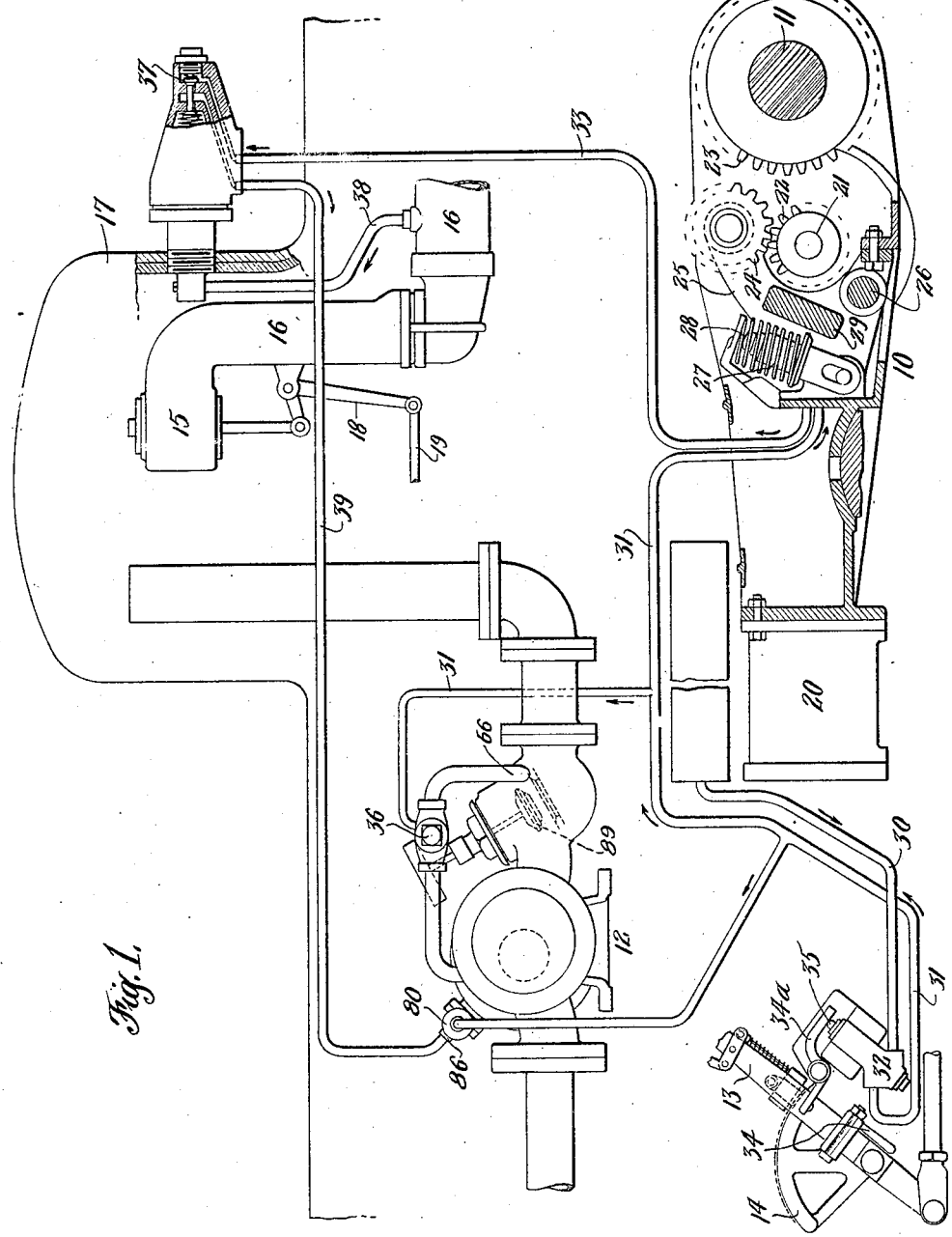

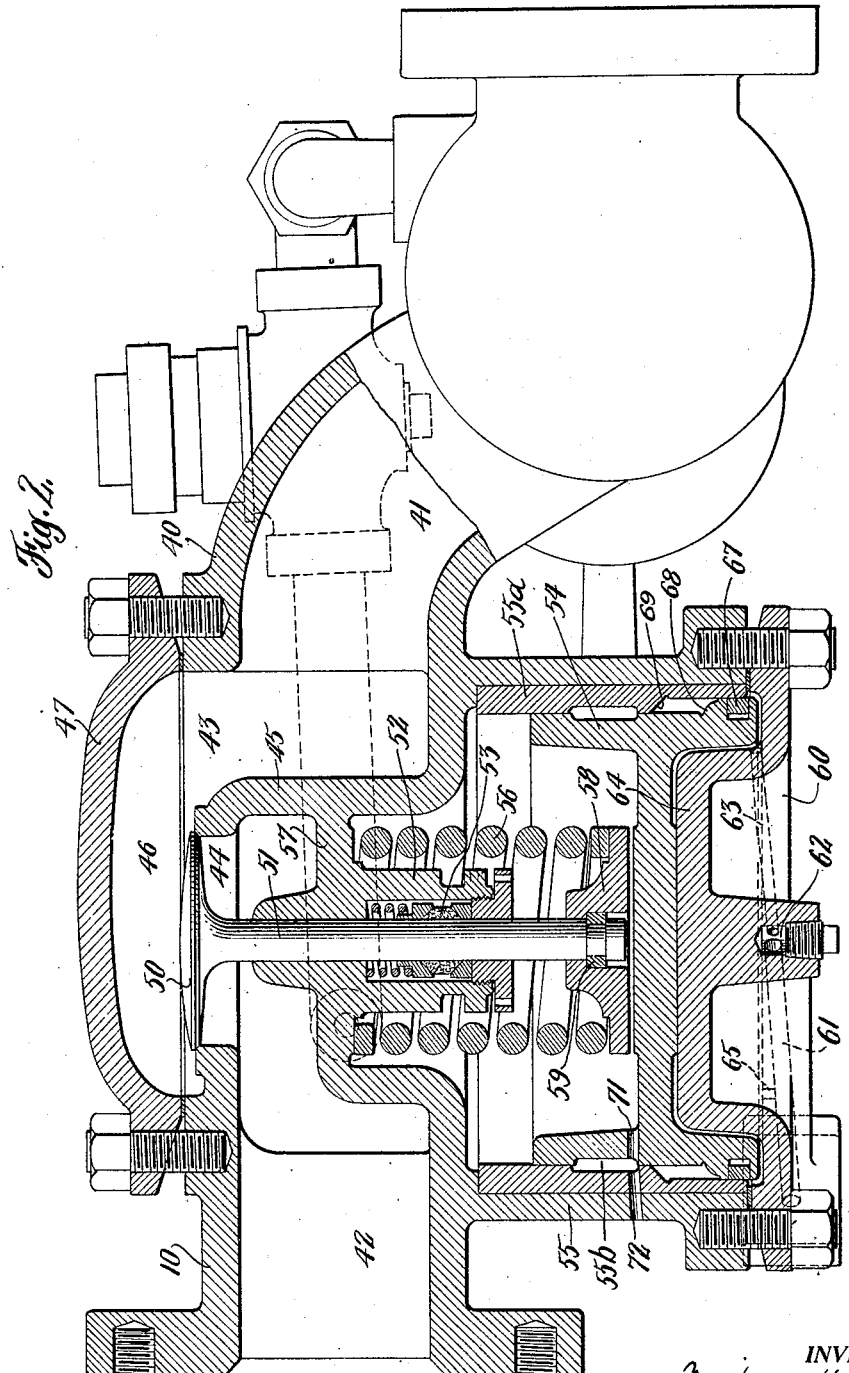

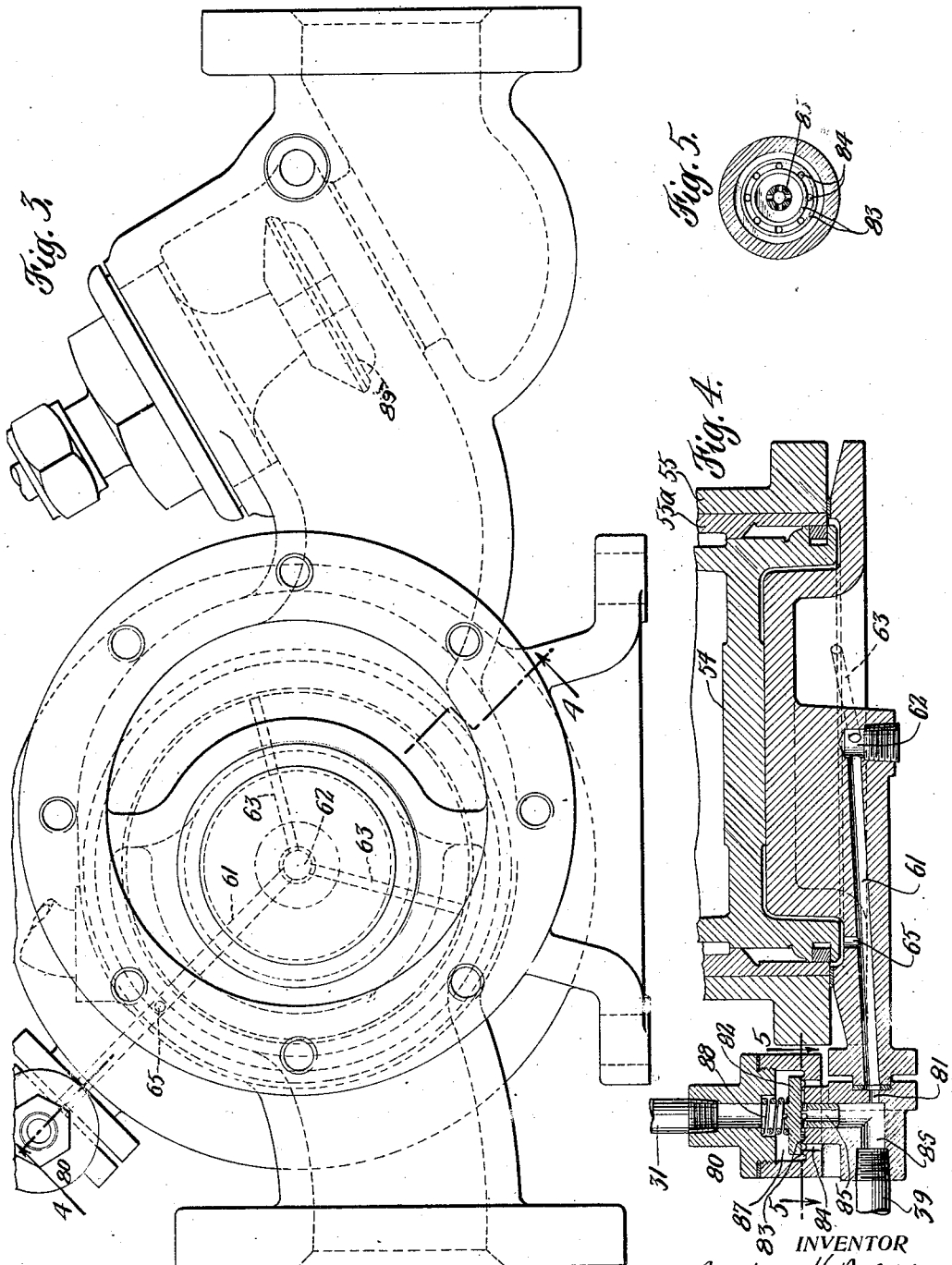

WITNESSES
Gustav Henzlinger.

INVENTOR
Montague H. Roberts
By Synnestvedt Lechner
Atty

Patented May 28, 1929.

1,714,626

UNITED STATES PATENT OFFICE.

MONTAGUE H. ROBERTS, OF ENGLEWOOD, NEW JERSEY, ASSIGNOR TO FRANKLIN RAILWAY SUPPLY COMPANY, A CORPORATION OF DELAWARE.

BOOSTER THROTTLE AND CONTROL.

Application filed February 20, 1924. Serial No. 694,174.

My invention relates to the throttles and the control of locomotive boosters. I aim to provide a simple and reliable throttle, that can be operated by the fluid pressure usually employed in the control systems of locomotive boosters; to prevent hammering or "slamming" in the operation of such a throttle; and to quicken its action and improve the control of the booster. How these and other advantages can be realized through the invention will appear from my description hereinafter of selected and preferred embodiments.

In the drawings, Fig. 1 is a schematic diagram of the operating parts and connections of a locomotive booster and its control system, including one form of my improved type of throttle valve, various parts being in section.

Fig. 2 shows a longitudinal section through a throttle valve construction such as shown in Fig. 1.

Fig. 3 is a plan view of the device shown in Fig. 2, with the upper wall or cover of the valve casing removed.

Fig. 4 shows a fragmentary axial section through the device, taken as indicated by the line 4—4 in Fig. 3.

Fig. 5 shows a horizontal section through an accessory part or device that is otherwise best illustrated in Fig. 4, taken as indicated by the line 5—5 in that figure.

Figure 6:
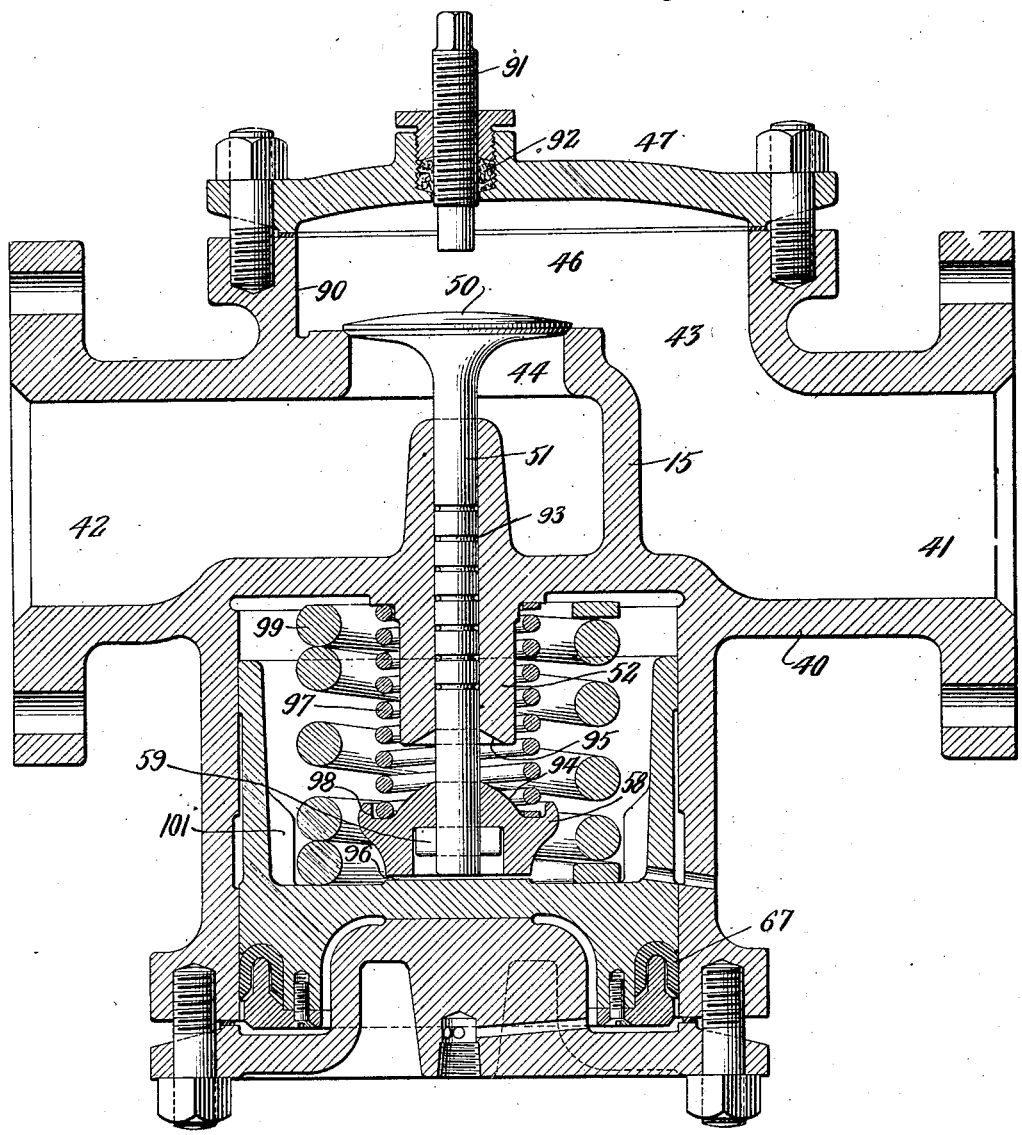
Fig. 6 shows a longitudinal section similar to Fig. 2 through another form of throttle valve, with certain associated parts in side elevation.

The general booster arrangement and control illustrated in Fig. 1 are substantially as shown in U. S. Patent No. 1,470,761 to Frank R. Peters, granted October 16th, 1923 and in U. S. Patent No. 1,470,082 to Ingersoll, granted October 9th, 1923, and now well understood in this art.

The booster engine or motor 10 may be applied to an axle 11 of the locomotive trailer truck, or to any other suitable axle of the locomotive, of its tender, or of some other vehicle or car in the train. The booster 10 being intended to assist the locomotive in starting and at slow speeds,—but not to drive the locomotive by itself, or to operate at all at high speeds,—provisions are made for connecting the booster to the axle 11 and disconnecting it therefrom in correlation with the operation of the locomotive, and for operating the booster throttle 12 in like correlation. For controlling the operation of the locomotive, there may be provided the usual reverse lever 13 with its quadrant 14, and the usual main throttle valve 15 for the steam pipe 16 (leading to the locomotive valve chests and cylinders), mounted in the steam dome 17 and operated through the bell-crank 18 by means of the reach rod 19.

The diagrammatic illustration of the booster 10 in Fig. 1 shows one of its cylinders 20 and its crank shaft 21, and also the pinions 22, 23 and idler gear 24 through which the axle 11 is driven from said shaft 21. The idler pinion 24 is mounted on a rocker 25 fulcrumed at 26: it is always in mesh with the pinion 22, and is swung into and out of mesh with the pinion 23 by a movable operating cylinder 27 and an opposing spring 28 and counterweight 29. Fluid pressure, preferably air, is supplied to the cylinder 27 through pipes 30 and 31 with an interposed valve 32, and is conducted from the cylinder 27 through the pipe 33, as will appear hereinafter. The booster is said to be "entrained" when pressure in the cylinder 27 throws the idler gear 24 into mesh with the gear 23. Disentrainment is accomplished by exhausting the fluid pressure from the cylinder 27,—whereupon spring 28 and counterweight 29 return the rocking member 25 to the position shown in Fig. 1.

The initial step toward actually bringing the booster 10 into operation is usually effected by throwing the reverse lever 13 "into the corner", as it is colloquially expressed,—which means to the right in Fig. 1, so as to set the locomotive valve gear for starting the locomotive ahead. When the lever 13 is in this position, a latch 34 carried by it (and previously turned up 180° from the position shown in Fig. 1) engages and tips a rocker lever 34ª, and thereby holds depressed the plunger 35 of the "reverse lever pilot valve" 32, as said valve 32 is termed. This shuts off the exhaust from the pipe 31 (otherwise afforded by the valve 32), and admits pressure from the supply 30 through said pipe 31 into the cylinder 27, so as to entrain the booster as already described. Through a branch of the pipe 31, the air also passes to the "booster throttle by pass valve" 36 and opens it, thus admitting a small amount of steam to the booster 10 to turn it over slowly and facilitate proper meshing of the gears 23 and 24, etc. in the manner now well known in the art. The movement of the cylinder 27 which accomplishes the entrainment also admits the air to the pipe 33, which leads to a normally closed valve 37 termed the "throttle pilot and control valve." Here the passage of the air is blocked, until (and unless) the main locomotive throttle 15 is opened to admit steam through the pipes 16 and 38 to shift the valve 37 and thus let the air into the pipe 39 leading to the booster throttle 12. The opening of this throttle 12 admits full steam pressure to the already entrained booster 10, thus bringing the latter into operation to assist in driving the locomotive.

When the reverse lever 13 is moved "out of the corner" and the pilot valve 32 thus allowed to resume its normal position, the booster is disentrained and put out of operation by a reverse series of operations. Its throttle 12 is also closed, of course, if the main throttle 15 is closed,—regardless of the position of the reverse lever 13.

It will be seen, therefore, that while bringing of the booster 10 into operation is initiated by means of the reverse lever latch 34, etc., and the admission of pressure to the pipe 31, yet the ultimate action of these agencies is dependent on proper conditions for operation of the booster existing or being brought about, since such action is controlled by the booster entraining cylinder 27 and by the main throttle pilot and control valve 37, both of which must act before the pressure is permitted to open the throttle.

As thus far described, the construction and operation of the booster 10 and its control system are substantially the same as set forth in the Peters and Ingersoll patents already cited; and I have here described the same merely because an understanding thereof is needful to a clear understanding of my present invention, which is more especially concerned with the booster throttle 12 and its control.

The throttle valve illustrated in Figs. 2–5 comprises a casing or body 40 with inlet and outlet 41 and 42 for fluid, and with its ends flanged for connection in a line of piping or the like. In the upper side of the casing 40, there are openings or ports 43, 44, one at either side of a transverse wall or septum 45 cast integral with the casing, and (except for the ports 43, 44) completely occluding the passage through it. Over and connecting the ports 43, 44, there is a lateral chamber 46, formed by the dished conformation of a detachable cover 47. Passage of motive fluid is controlled by a valve 50 that seats over the port 44, and lifts into the chamber 46 in opening. As here shown, the valve 50 is a single bevel edged poppet disc on the end of an operating stem 51 that extends out through an extended guide boss 52 on the lower wall of the casing 40. A stuffing box with spring compressed metallic packing 53 is provided in the boss 52, for preventing the leakage of steam along the valve stem 51. In the present instance, the valve 50 is unbalanced, and thus tends to close under steam pressure in the chamber 46.

For actuating the valve 50, there is a pressure member 54 in the form of a piston, working in a cylinder chamber 55 at the lower side of the casing 40. The valve 50 is opened by admission of fluid under pressure (particularly, the compressed air very commonly used in booster control systems) beneath the piston 54, and the parts are spring returned, so that the valve will close automatically when the cylinder pressure is released,—even in the absence of any steam pressure. For this purpose, there is a helical compression spring 56 interposed between the piston 54 and the casing wall at 57, which is offset or recessed inward around the boss 52 to accommodate the spring. The spring 56 is centered around the boss 52 and around the shoulder of an abutment part 58 that bears on a key 59 on the grooved lower end of the stem 51.

A detachable cylinder cover 60 has a pressure supply duct 61 leading to a central chamber 62, and several small radial ducts 63 leading therefrom to the annular space surrounding an inward projecting central boss 64 on the cover 60. The ducts 63 open into the cylinder 55 at widely separated points so located (Fig. 3) that the cylinder can always drain through one or another of them, even if it be not perfectly level. Besides supplying the chamber 62 and the ducts 63 leading to the lower end of the cylinder 55, the duct 61 has a small hole 65 (Fig. 4) directly opening into the cylinder, so as to answer the purpose of a third duct such as 63 in assuring free supply and drainage for the cylinder in all positions. The ducts 63 and the hole 65 are shown equally spaced around the cylinder. The piston 54 is centrally recessed at one side, to accommodate the cover boss 64, and at the other to accommodate the spring 56, etc. While it is guided by the cylinder walls at its upper and lower ends, it is here shown with a shallow intermediate groove to reduce friction. At its lower end, the piston 54 has a metallic ring packing 67, to prevent or minimize leakage. The lower portion of the piston 54, that carries the packing 67, is of greater diameter than the rest, and the shoulder 68 that marks the change in size is rounded for sealing against a shoulder 69 at the junction of the correspondingly different sized cylinder bores. As shown, the cylinder 55 is provided with a renewable liner 55ª that affords a wearing surface for both its bores and the shoulder 68. Clearance is allowed between the part 58 and the piston 54 when the latter is in its lowermost position, to permit the valve 50 to seat properly even after several regrindings. To obviate accummulation of steam, air, or water of condensation from any leakage into the upper end of the cylinder 55 that may occur (either along the stem 51, or past the piston 54), vent openings or ports 71, 72 may be provided through the cylinder wall and through the upper hollow portion or "skirt" of the piston 54. As shown, the wall has a broad, shallow internal groove 55ᵇ all the way around to afford communication between the ports 71 and 72 when the piston 54 rises to the upper end of the cylinder.

Figs. 3, 4 and 5 show more clearly than Fig. 2 the preferred mode of air supply for the device illustrated in Figs. 2–5. As here shown, the supply connection includes an unloader 80 mounted at the periphery of the cylinder cover 60, and communicating with the duct 61 through a constricted opening 81. The unloader 80 may be briefly described as comprising a valve disc 82 that seats on annular ridges 83 between which are a number of relief ports 84 opening directly to the atmosphere, and within which is a central radially ported sleeve 85 communicating with the pressure supply inlet 86 to which is connected the pipe 39. When air pressure from the pipe 30 is admitted to the pipe 31 by the pilot valve 32, as described above, it passes through a branch of said pipe 31 to a chamber 87 at the upper side of the disc 82. A helical compression spring 88 cooperates with the pressure so admitted to hold the disc 82 seated against any pressure from the pipe 39 acting on the small area of its lower side within the inner ridge 83. Subsequently, when the valve 37 admits the air to the pipe 39 and the inlet 86, the pressure builds up gradually beneath the piston 54, owing to the smallness of the opening 81 from the unloader to the cylinder 55; and thus slamming when the valve 50 opens against the progressively increasing resistance of the spring 56 is obviated. And when, finally, the pressure in the pipe 31 is relieved by the pilot valve 32 as a result of throwing the reverse lever 13 "out of the corner", pressure beneath the valve 82 lifts it off the ridges 83 and is relieved or released through the ports 84,—thus allowing the valve 50 to close at once, independently and irrespective of the disentrainment of the booster which ultimately ensues. The escape of the air at the small opening 81 is slow enough, however, to prevent slamming when the valve 50 closes.

As shown in Figs. 1 and 3, there is a manually operable stop valve 89 in the casing 40 at the inlet side of the throttle valve 50, for cutting off steam from the valve 50 when it requires repair, or for absolutely preventing operation of the booster if out of order or the like.

In the construction shown in Fig. 6, the cover 47 over the parts 43, 44 is less dished than in Fig. 2, and an upstanding wall 90 around these parts helps to form the chamber 46. Opposite the valve 50, a screw 91 extends through a stuffing box 92 in the cover 47; and by screwing this screw 91 down on the valve, the latter can be held tight on its seat. Instead of a stuffing box in the guide boss 52, there are water seal grooves 93 in the valve stem 51 to prevent or minimize leakage of steam outward along it. The packing 67 for the piston 54 is of the cup type instead of the ring type shown in Figs. 2 and 4, and the differential cylinder and piston bore and shoulder feature is dispensed with. As a means of preventing leakage when the valve 50 is open, the abutment part 58 has a "conoidal" or rounded upper surface 94 adapted to seat or seal in a conical recess 95 at the lower end of the boss 52, and a flat lower surface (around its recess for the key 59) adapted to seal with a flat surface 96 on the piston 54. When the valve 50 is open, the air pressure on the seals at 94, 95, 96 keeps them tight and effectively prevents leakage along the stem 51,—notwithstanding an easy fit of the latter in the part 52.

In Fig. 6, also, the single spring for returning the piston shown in Fig. 2 is replaced by two such springs, arranged one within the other. The inner spring 97 is centered around the boss 52 and within the flange 98 of the abutment part 58, while the outer spring 99 is centered by external engagement with lugs 101 on the piston 54. The spring 97 is arranged to be stressed from the very moment the valve 50 begins to open, while the spring 99 is not initially affected, but only comes into action somewhat later. The spring 99, however, is of much heavier scale than the spring 97.

When air pressure is admitted to open the valve 50 of the Fig. 6 device, the air first entering the cylinder 55 has only to compress the light spring 97. The stronger spring 99 comes into play only after the steam pressure under the now open valve 50 has become sufficient to balance that above. The time required for this to take place (and for the air pressure under the piston 54 to reach a value capable of compressing the spring 99) is sufficient to prevent slamming or hammering of the parts,—especially in view of the progressive increase in the resistance of both springs as the valve 50 opens further. When, on the other hand, the air pressure is released, the spring 99 expands completely and exerts its full effect before the valve 50 quite reaches its seat. The closing movement is completed by the steam pressure and the light spring 97,—which, however, has not sufficient tension and power to slam the piston.

In Fig. 6, various parts and features are marked with the same reference characters as in Figs. 1-5, as a means of dispensing with merely repetitive description.

I claim:

1. The combination with a booster and its throttle of a control system comprising initiatory means for bringing the booster into operation or putting it out of operation, means successively dependent on said first means and on conditions for booster operation for ultimately permitting the booster throttle to be opened, and means for closing the booster throttle controlled by said first-mentioned means independently of the second-mentioned means.

2. The combination with a booster and a pressure-actuated throttle therefor, of a control system comprising means for initially admitting or releasing pressure, means successively dependent on said first means and on conditions for booster operation controlling the ultimate admission of such pressure to open the booster throttle, and an unloading valve for relieving such opening pressure on the throttle responsive directly to relief of the initial pressure as aforesaid.

3. The combination of a locomotive booster, a throttle valve therefor, a fluid pressure motor for opening said throttle, a source of fluid pressure, an unloading valve for exhausting the fluid pressure from said motor, said unloading valve being adapted to be pressure held in closed position, and means for supplying pressure from said source to said motor and to said unloading valve, said unloading valve being adapted to open upon a discontinuance of said supply.

4. The combination of a railway vehicle axle, a booster motor, means for entraining the booster with said axle, a fluid motor for actuating said entrainment means, a booster throttle, a fluid motor for actuating said throttle, a source of fluid pressure, a pilot valve for controlling the supply of fluid to both of said actuating motors, an unloading valve of relatively large capacity for quickly exhausting the fluid from said booster throttle motor, said unloading valve being adapted to be pressure held in closed position, and means for supplying pressure coming from said pilot valve to hold the unloading valve in closed position, said unloading valve being adapted to open upon a discontinuance of said pressure supply.

5. The combination of a railway vehicle axle, a booster, a fluid actuated mechanism for entraining the booster with the axle, a booster throttle, a fluid actuated mechanism for opening the throttle, a source of fluid supply, a valve and connections for successively supplying the entraining mechanism and then the throttle actuating mechanism with fluid from said source, an unloading valve on the throttle actuating mechanism adapted to be pressure held in closed position, and means for supplying said unloading valve with pressure from said source when said entraining mechanism and said throttle actuating mechanism are being supplied, said unloading valve being adapted to open upon a discontinuance of the pressure to it.

6. The combination of a locomotive, a booster, a booster throttle, a fluid motor for actuating said throttle, a source of fluid pressure, a locomotive throttle, means for delivering fluid pressure to said booster throttle motor after the locomotive throttle has been opened, an unloading valve for exhausting the fluid from said booster throttle motor, said unloading valve being adapted to be pressure held in closed position, and means for supplying pressure from said source to hold the unloading valve in closed position, said unloading valve being adapted to open upon discontinuance of said supply.

In testimony whereof, I have hereunto signed my name.

MONTAGUE H. ROBERTS.